US012658041B2

(12) United States Patent
Lei et al.

(10) Patent No.: US 12,658,041 B2
(45) Date of Patent: Jun. 16, 2026

(54) EDGE COMPUTING ASSISTED VEHICLE ALERTING SYSTEM AND METHODS

(71) Applicant: Ford Global Technologies, LLC, Dearborn, MI (US)

(72) Inventors: Oliver Lei, Windsor (CA); Michael Ryan, New Hudson, MI (US); Jayanthi Rao, West Bloomfield, MI (US); Niraj Altekar, Farmington Hills, MI (US); Arpita Chand, Dearborn, MI (US); Somak Datta Gupta, Novi, MI (US); Vladyslav Slyusar, Palo Alto, CA (US)

( * ) Notice: Subject to any disclaimer, the term of this patent is extended or adjusted under 35 U.S.C. 154(b) by 274 days.

(21) Appl. No.: 18/333,525

(22) Filed: Jun. 12, 2023

(65) Prior Publication Data

US 2024/0412630 A1 Dec. 12, 2024

(51) Int. Cl.

*G08G 1/0965* (2006.01)
*G08G 1/052* (2006.01)

(52) U.S. Cl.

CPC ........... *G08G 1/0965* (2013.01); *G08G 1/052* (2013.01)

(58) Field of Classification Search

CPC .... G08G 1/0965; G08G 1/052; G08G 1/0112; G08G 1/0133; G08G 1/096775; H04W 4/44
USPC .......................................................... 701/119
See application file for complete search history.

(56) References Cited

U.S. PATENT DOCUMENTS

| | | | | |
|---|---|---|---|---|
| 11,210,943 | B2 | 12/2021 | Lei et al. | |
| 11,516,620 | B2 | 11/2022 | Ong et al. | |
| 2021/0237734 | A1* | 8/2021 | Buburuzan | G08G 1/096791 |
| 2021/0241624 | A1* | 8/2021 | Kan | G07C 5/085 |
| 2023/0093282 | A1* | 3/2023 | Bergen | G01S 13/751 701/26 |
| 2023/0413026 | A1* | 12/2023 | Khosla | G08G 1/096783 |

FOREIGN PATENT DOCUMENTS

| | | | |
|---|---|---|---|
| CN | 113965568 | A | 1/2022 |
| CN | 115206115 | A | 10/2022 |
| CN | 115440062 | A | 12/2022 |

OTHER PUBLICATIONS

Marco Malinverno et al., Edge-Based Collision Avoidance for Vehicles and Vulnerable Users: An Architecture Based on MEC, IEEE Vehicular Technology Magazine, Dec. 25, 2019, pp. 1-9.
Shaoshan Liu, et al., Edge Computing for Autonomous Driving: Opportunities and Challenges, IEEE, vol. 107, No. 8, Aug. 2019, pp. 1697-1716.

* cited by examiner

*Primary Examiner* — Aniss Chad
(74) *Attorney, Agent, or Firm* — Emily Campbell; Eversheds Sutherland (US) LLP

(57) ABSTRACT

Systems and methods for implementing edge computing assisted vehicle alerts. A multi-access edge computing (MEC) server may be configured to obtain a plurality of messages from one or more vehicles, determine formation of a traffic queue based on the plurality of messages, determine a plurality of zone-based speed limits, determine when a vehicle approaching the traffic queue may be traveling faster than desired based on its location relative to an applicable zone-based speed limit, and generate one or more alerts.

19 Claims, 6 Drawing Sheets

EDGE COMPUTING ASSISTED VEHICLE ALERTING SYSTEM AND METHODS

BACKGROUND

It may be challenging to determine appropriate vehicle speed when there are variable and quickly changing road and traffic conditions.

BRIEF DESCRIPTION OF THE DRAWINGS

A detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure is directed to systems and methods for edge computing assisted traffic queue detection, speed limit zone creation, and/or fast-approaching vehicles alerting system. In various instances, multi-access edge computing (MEC) is utilized to detect traffic queues in an area, determine a plurality of speed limit zones for vehicles approaching the traffic queue, determine vehicles that are operating at abnormal speeds, and alert other vehicles in front. In various embodiments, cellular multicast functionality is used to broadcast and receive messages to facilitate an alerting system. For example, a 5G network may be utilized to facilitate real-time, two-way communications between vehicles and a MEC server.

Figure 1:
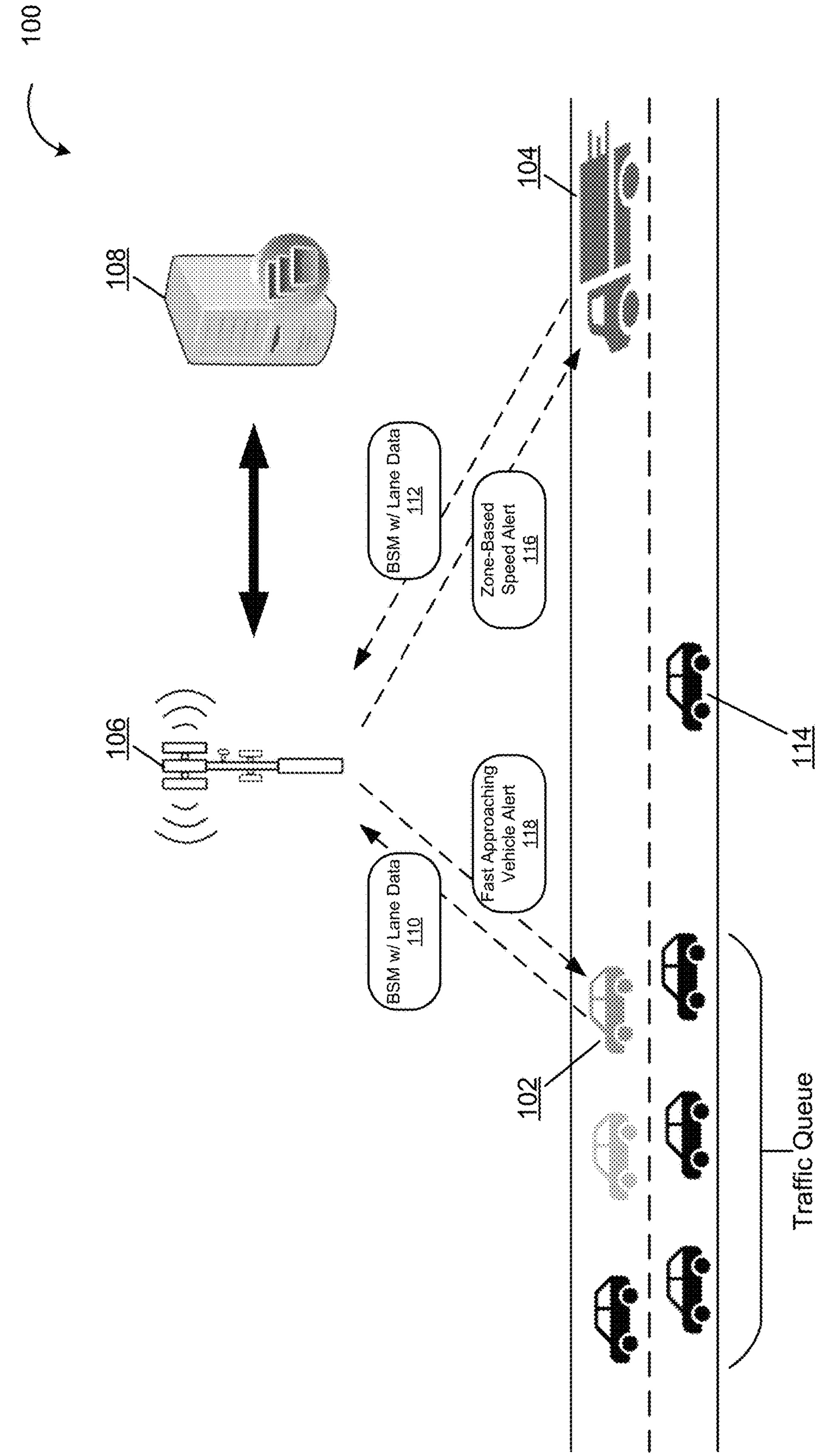
FIG. 1 depicts an illustrative environment in which systems and methods for edge computing assisted traffic queue detection, speed limit zone creation, and/or fast-approaching vehicles alerting system may be implemented, in accordance with at least one embodiment of the present disclosure.

FIG. 1 depicts an illustrative environment 100 in which systems and methods for edge computing assisted traffic queue detection, speed limit zone creation, and/or fast-approaching vehicles alerting system may be implemented, in accordance with at least one embodiment of the present disclosure.

FIG. 1 depicts an environment in which there may be various vehicles, such as vehicles 102 and 104 and the other vehicles illustrated. Vehicles may be traveling on the road in different lanes and at different speeds. For example, vehicle 102 may be driving slowly as it is in a traffic queue, whereas vehicle 104 may be driving more quickly. One of the challenges that vehicle operators may encounter is the difficulty in determining appropriate operating speeds based on variable traffic conditions. For example, if vehicle 102 is stopped or moving slowly (e.g., <10 mph) in a traffic jam, then vehicles behind vehicle 102 may need to slow down as they approach the traffic jam. On a highway, the posted speed limit may be appropriate in some circumstances (e.g., when traffic is flowing without any disruptions) but inappropriate in other circumstances (e.g., when there is a traffic jam or congestion).

In various embodiments, vehicles such as vehicle 102 and vehicle 104 comprise sensors such as front-facing cameras and a communications module (e.g., a C-V2X communications module). Vehicles on the road may transmit data regarding their position, heading, and lane data via network infrastructure 106 to multi-access edge computing (MEC) server 108. In various embodiments, network infrastructure 106 uses a high-frequency communications channel to enable high-speed, low-latency communication between vehicles and MEC server 108.

In various embodiments, vehicles emit data at regular intervals in the form of Basic Safety Messages (BSMs). The data may include information regarding the state of a vehicle. For example, a vehicle may emit a packet of data that includes its measured location (e.g., as GPS coordinates), the direction it is headed, its present velocity, and so on and so forth. In various embodiments, lane data is also collected by the vehicle. For example, vehicle 102 may transmit a regular stream of BSMs (e.g., BSM 110) to network infrastructure 106 and vehicle 104 may transmit a regular stream of BSMs (e.g., BSM 112) to network infrastructure 106.

Network infrastructure 106 may facilitate communications between vehicles (e.g., vehicle 102 and vehicle 104) and MEC server 108. The network infrastructure may include cellular communications towers that provide for high-speed, low-latency communication with MEC server 108. In various embodiments MEC server 108 receives BSMs from vehicles in a nearby proximity and uses the data to determine appropriate driving speeds based on the known traffic conditions. For example, the left-hand portion of FIG. 1 may depict a traffic jam or congestion where vehicles in the traffic jam emit BSMs with their location, speed (e.g., under 10mph) and lanes to MEC server 108. MEC 108 may use the BSM information to determine where the slowdown has occurred, the size and location of the queue, and a plurality of traffic-aware speed zones. Each zone may have an associated speed limit that encodes the appropriate speed for which a vehicle should be traveling with the zone. For example, a first zone may encompass the queue of vehicles on the left-hand portion that prescribes a low speed due to the vehicles being in close proximity to each other and that the vehicles are generally traveling at slow speed. Vehicle 114 may be in a second zone, and the vehicle 114 may receive a message indicating that the vehicle should be traveling at some slower speed to be able to have a desirable braking distance upon reaching the traffic queue. Continuing with this example, vehicle 104 may be in a third zone where the speed limit is relatively higher than the first and second zones due to the vehicle 104 being farther away and having a longer distance over which to slow down and brake before reaching the traffic queue.

In various embodiments, MEC server 108 receives BSM data, determine when a vehicle is operating outside of prescribed parameters, and is able to issue alerts. As an example, consider a case in which MEC server 108 has received BSM data to determine that there is a traffic queue ahead of vehicle 104, determine a zone-based speed limit for vehicle 104, and also that vehicle 104 is travelling faster than the zone-based speed limit. In such a scenario, MEC server 108 may send a zone-based speed alert 116 to vehicle 104. The zone-based speed alert 116 may be transmitted to vehicle 104 via network infrastructure 106 and may be presented to the vehicle's operator. For example, the vehicle's operator may receive a visual and/or audio indication to slow down or that there is a traffic queue ahead. In some embodiments, the vehicle operator is autonomous or semi-autonomous, such that the vehicle can programmatically respond to the zone-based speed alert 116 without human intervention and commence braking in response to receiving the zone-based speed alert 116. In some embodiments, MEC server 108 may send a fast approaching vehicle alert 118 to a vehicle in front of a speeding vehicle. For example, if vehicle 104 is travelling at a speed beyond what is expected based on the zone-based speed limits, one or more cars in front of vehicle 104 that are in the same lane may be alerted. The MEC server can use lane data from the BSMs to identify which vehicles should be alerted. For example, vehicle 102 is directly in front of vehicle 104 and may receive the fast approaching vehicle alert 118 and can, for example, respond to the alert by pulling over to a shoulder, activate blinkers or other visual indicators, or perform other mitigations to avoid or reduce a potential adverse consequences in the event that the vehicle is not able to stop in time.

Figure 2:
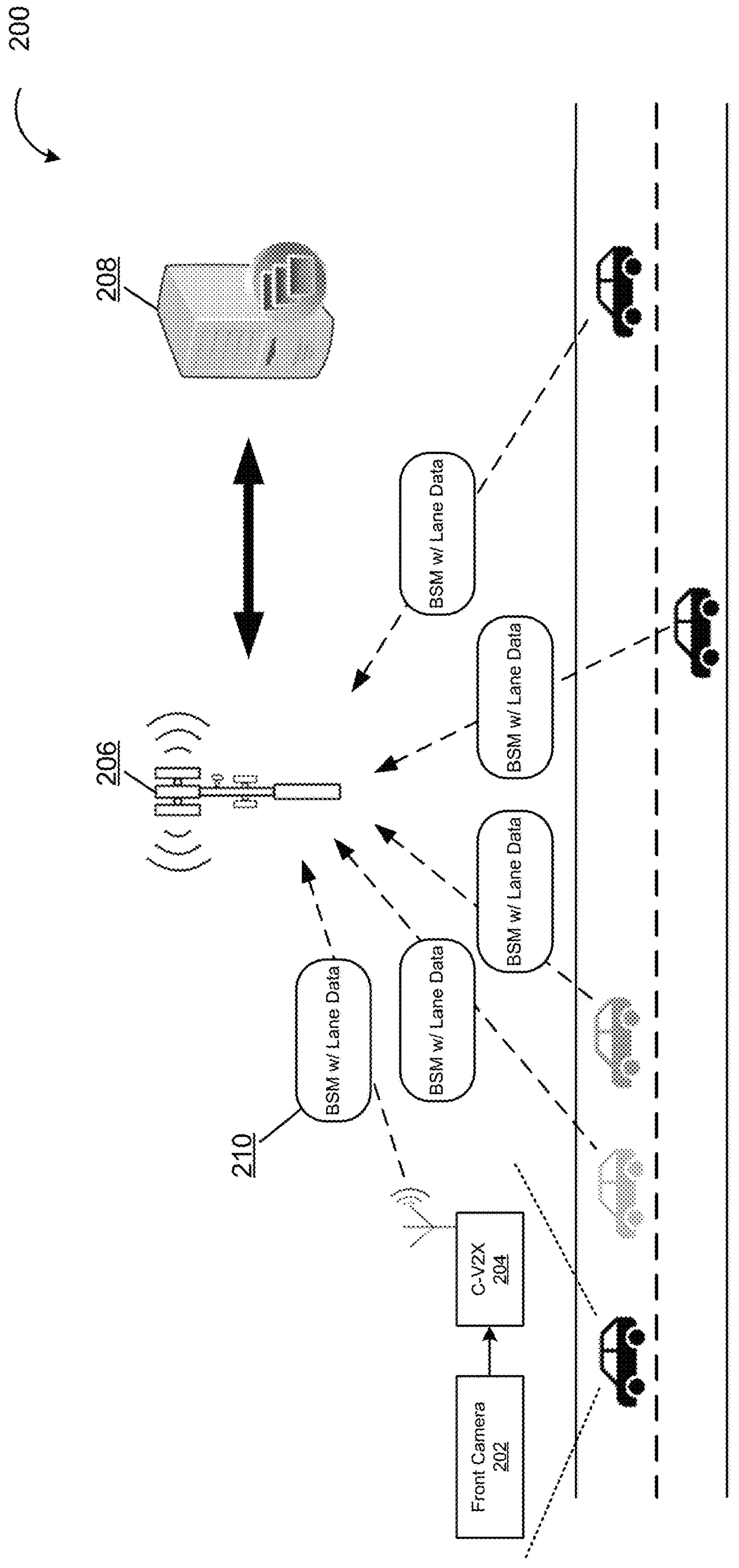
FIG. 2 illustrates a diagram depicting an example of an environment in which Basic Safety Messages (BSMs) messages are used to relay lane data to a multi-access edge computing (MEC) server, according to at least one embodiment of the present disclosure.

FIG. 2 illustrates a diagram depicting an example of an environment 200 in which Basic Safety Messages (BSMs) are used to relay lane data to a multi-access edge computing (MEC) server, according to at least one embodiment of the present disclosure.

In various embodiments, vehicles within the environment 200 are configured to receive and/or transmit messages. The messages may be used to relay information regarding the vehicle speed, location, heading, lane information, or other relevant data in real-time or near real-time. In various embodiments, the messages are implemented as a Basic Safety Message (BSM) or other standardized message format. The vehicles may be equipped with Dedicated Short-Range Communication (DSRC) technology and/or cellular V2X (C-V2X) technology to communicate with other vehicles, infrastructure, or other electronic devices in the surrounding environment.

In various embodiments, vehicles will broadcast BSMs (e.g., BSM 210) at regular intervals and can be received by other vehicles or infrastructure within range, such as multi-access edge computing (MEC) server 208. The information contained in the BSM can then be used by the receiving vehicle or infrastructure to make informed decisions about how to operate in a more desirable manner.

Network infrastructure 206 may facilitate communications between vehicles and MEC server 208. The network infrastructure may include cellular communications towers that provide for high-speed, low-latency communication with MEC server 208. In various embodiments MEC server 208 receives BSMs from vehicles in a nearby proximity and uses the data to determine appropriate driving speeds based on the known traffic conditions. MEC server 208 may receive BSMs from vehicles with GPS location, current lane data, speed direction, etc. In various embodiments, MEC server 208 collects these BSMs and determines when a traffic queue (e.g., length, location, average speed, road topology, etc.) has formed.

In various embodiments, a vehicle comprises a cellular vehicle-to-everything (C-V2X) module 204 for performing communication between the vehicle and its surrounding environment, including other vehicles, infrastructure, and more. In various embodiments, C-V2X module 204 is subscribed to local MNO to receive traffic data via multicast/broadcast. V2X communication includes both V2V (Vehicle-to-Vehicle) and V2I (Vehicle-to-Infrastructure) communication, as well as other forms of communication such as V2P (Vehicle-to-Pedestrian) and V2B (Vehicle-to-Bicycle). Vehicle-to-Vehicle (V2V) communication can be used to exchange BSMs with other nearby vehicles to alert of potential adverse situations and Vehicle-to-Infrastructure (V2I) communication can communicate with roadside infrastructure such as traffic signals, cameras, or message signs to obtain information about road conditions or receive alerts. In various embodiments, the vehicle uses a cellular-V2X (C-V2X) communications module to transmit and receive messages to/from 5G network infrastructure.

A vehicle may have various on-board sensors. These sensors may include cameras, accelerometers, speedometers, and others. In various embodiments, a front camera 202 of a vehicle captures images of the environment in front of the vehicle and may be processed to determine lane information for the vehicle. For example, if the vehicle is travelling southbound on a three-lane highway, the lane information may be encoded as a numeral (e.g., from 0 to 2) where each numeral is mapped to a lane, such as 0=leftmost lane, 1=center lane, and 2=rightmost lane. This is merely an illustrative example of how lane information may be encoded, is not intended to be limiting, and other implementations are contemplated in the scope of this disclosure. The lane information may be determined using an on-board processor or a remote processor, for example, by sending raw footage captured by the front camera to a cloud server with greater compute capabilities. For example, machine-learning (ML)-based image processing techniques may be utilized to determine the lane information.

Some or all vehicles in a traffic environment may transmit BSMs (e.g., BSM 210) to MEC server 208. MEC server may receive the BSM messages and detect when and where the formation of traffic queue occurs. In various embodiments, MEC server 208 determines the traffic conditions in each lane of a roadway from the BSMs transmitted by vehicles on the roadway and determines, based on the traffic conditions, a plurality of zones and corresponding speed-limits for vehicles in each of the zones. Zone-based speed limits are discussed in more detail in FIG. 3.

Figure 3:
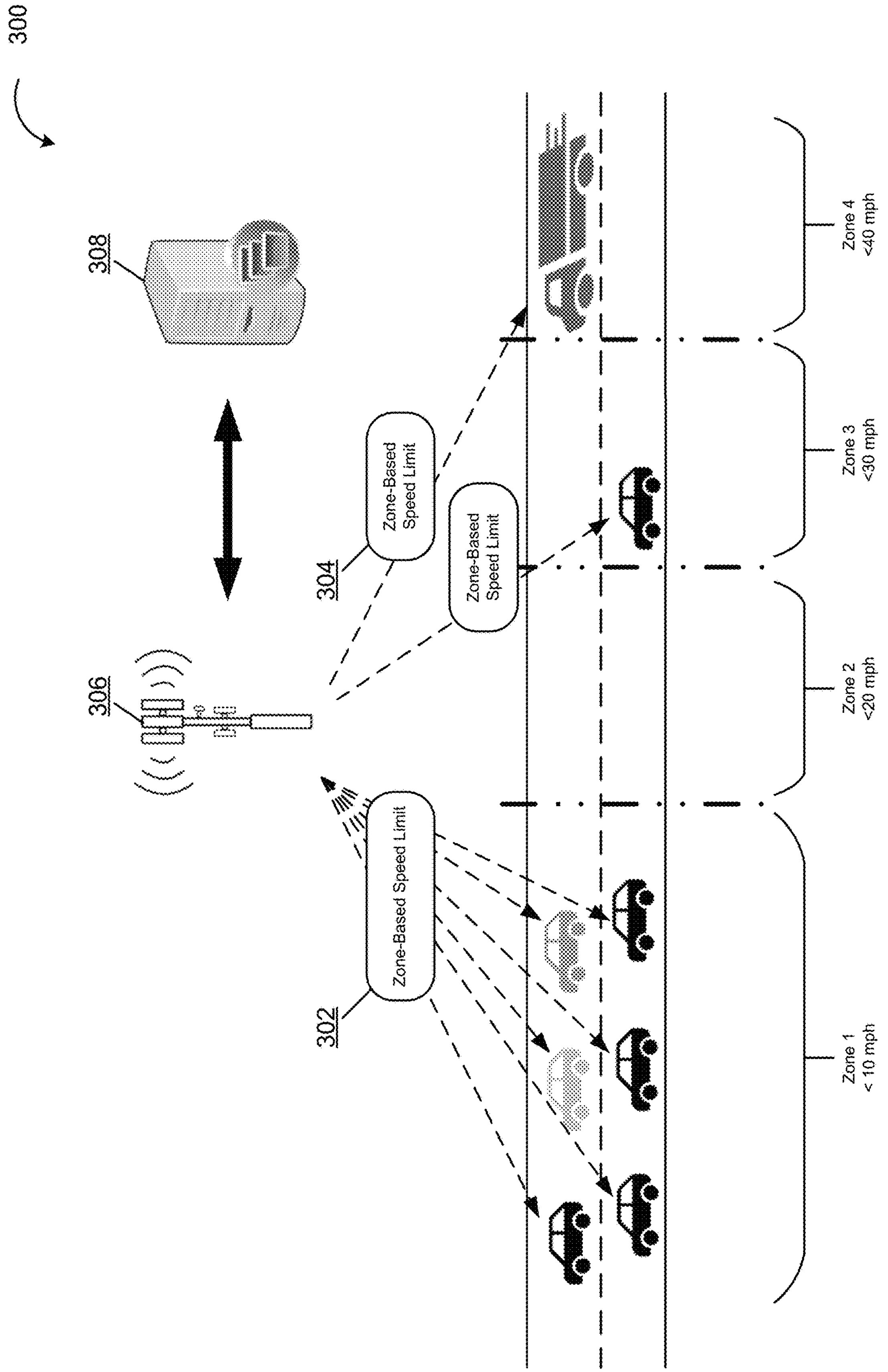
FIG. 3 illustrates a diagram depicting an example of an environment in which a multi-access edge computing (MEC) server transmits information to vehicles on a roadway, according to at least one embodiment of the present disclosure.

FIG. 3 illustrates a diagram depicting an example of an environment 300 in which a multi-access edge computing (MEC) server transmits information to vehicles on a roadway, according to at least one embodiment of the present disclosure.

In various embodiments, MEC server 308 receives BSMs from vehicles via network infrastructure 306. MEC server 308 may determine traffic conditions on a roadway and transmit messages (e.g., message 302 and message 304) to vehicles to provide zone-based speed limits. Vehicles on the road may transmit messages with lane indication information (e.g., learned from front cameras, etc.) to a local MEC server 308. The MEC server 308 collects these messages and detects a queue on a roadway. The MEC server 308 broadcasts messages that include various information such as position, direction, zone-based speed limit based on queue position/length/speed to all vehicles in the area. For example, vehicles in Zone 1 may already be in the traffic queue and receive messages 302 that indicate vehicles traveling in each lane should travel at speeds under 10 mph. Continuing, MEC server 308 may send other messages to vehicles in Zone 2, which may be at a distance between 0 and 100 meters from the end of the traffic queue and have a slightly higher zone-based speed limit of 20 mph. Continuing, Zone 3 may be at an even farther distance of 100-500 meters from the end of the traffic queue and have a different zone-based speed limit of 30 mph. Finally, a vehicle in zone 4 may receive a message 304 with a zone-based speed limit at a distance of over 500 meters of 40 mph. It should be noted that the zones depicted in FIG. 3 are not necessarily to scale and presented for illustrative purposes only.

In various embodiments, the zone-based speed limit comprises position data, direction, and speed limit. The location data may define the boundaries of a zone and may specific a particular lane (e.g., left, center, right lane) in which the zone-based speed limit applies (e.g., in cases where one lane has a traffic queue but not others). In various embodiments, MEC server 208 broadcasts/multicasts the zone-based speed limits to all vehicles in the area. In various embodiments, rear vehicles receive the messages with the zone-based speed limit and compares their current location with these zone message and show the corresponding data (e.g., position, direction, speed limit) to a driver, for example, via an HMI.

As the traffic conditions change and as vehicles move through the roadway, new messages will be sent by MEC server 308 to the vehicles to keep them appraised of the present traffic conditions. Accordingly, the messages may encode different zone-based speed limit values based on the location of the vehicle, the direction of the vehicle, the lane in which the vehicle is driving, etc., which provides a more accurate assessment of appropriate operating conditions as opposed to posted speed limit signs, which do not provide any insight into upcoming road and traffic conditions in real-time. For example, MEC server 308 may broadcast zone-based speed information (e.g., as BSMs) comprising position information (e.g., GPS coordinates), direction information, and speed limit information for a zone. Message 302 may be transmitted to vehicles in Zone 1 (e.g., based on BSM message with their location) with a first zone-based speed limit and message 304 may be transmitted to vehicles in Zone 4 with a different zone-based speed limit.

In various embodiments, the zone distances and/or speed limits can be determined based on vehicle characteristics. For example, different types of vehicles (e.g., based on make or model) may have larger or smaller zones, higher or lower zone-based speed limits, to accommodate greater or lesser amounts of braking distances needed. For example, FIG. 3 may depict example zones for a sedan, whereas an empty line haul truck may have lower speed limits over the same zone (or longer distances), whereas a filled line haul truck may have even lower speed limits or longer distances, etc.

Vehicles approaching the traffic queue may use the messages to take appropriate action. For example, message 304 may be transmitted to vehicle 310 with ample time to respond to changing traffic conditions and to initiate braking or slow down prior to approaching a traffic queue or other vehicles in the zones ahead of the vehicle.

Figure 4:
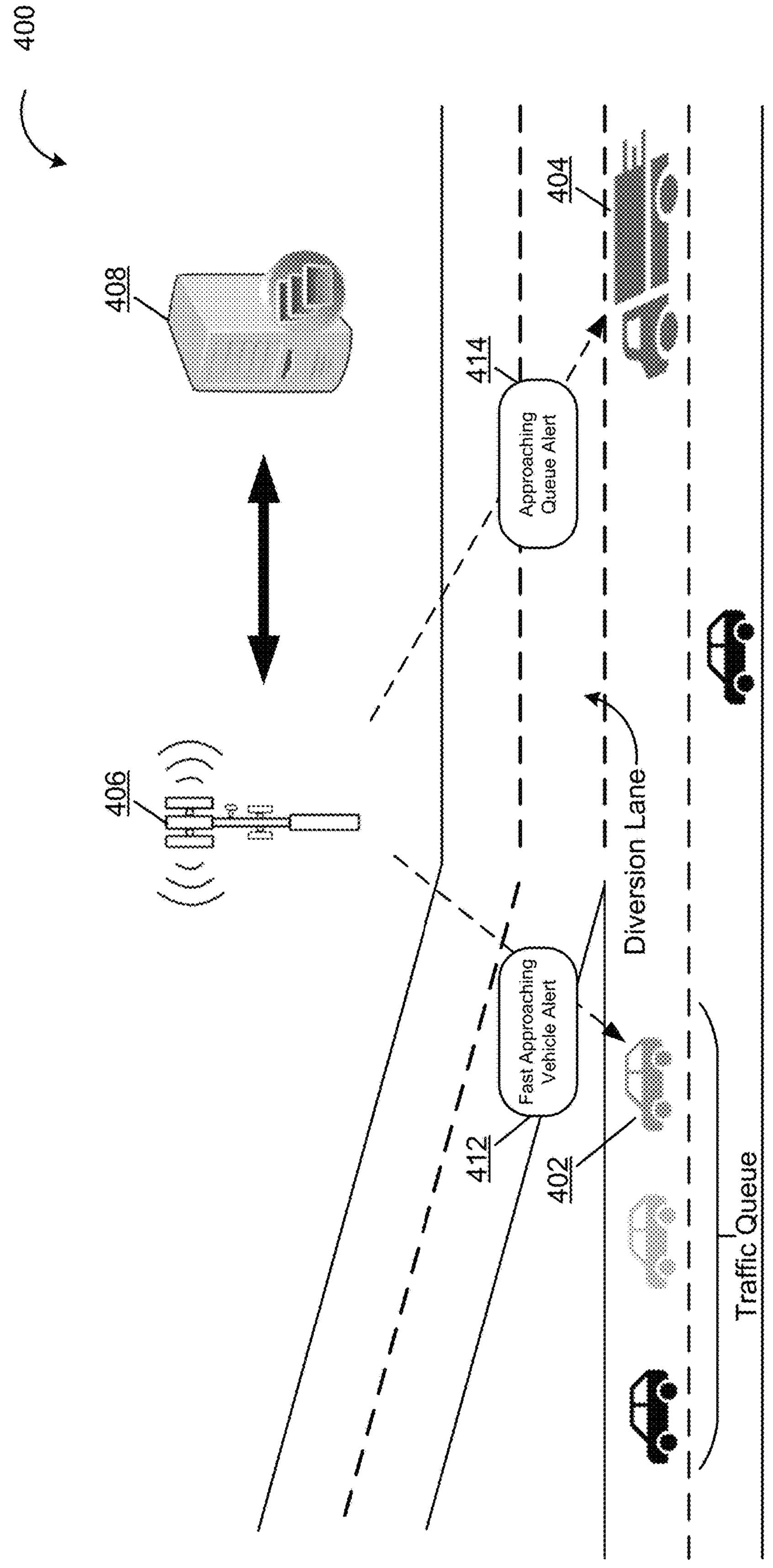
FIG. 4 illustrates a diagram depicting an example of an environment in which alerts are provided in response to an abnormal condition, according to at least one embodiment of the present disclosure.

FIG. 4 illustrates a diagram depicting an example of an environment 400 in which alerts are provided in response to an abnormal condition, according to at least one embodiment of the present disclosure.

In various embodiments, vehicles of FIG. 4 (e.g., vehicle 402 and vehicle 404) may provide Basic Safety Messages (BSMs) via network infrastructure 406 to a nearby multi-access edge computing (MEC) server 408. In various embodiments, the MEC server 408 monitors the traffic conditions based on BSMs received from vehicles on the roadway and determines where there are slowdowns, traffic queues, or other traffic conditions. The MEC server 408 may determine that a traffic queue has formed and the location of various vehicles with respect to the traffic queue. For example, MEC server 408 may use BSMs to determine that a traffic queue has formed at the left-portion of FIG. 4 and that vehicle 402 is the last vehicle in the traffic queue.

In various embodiments, vehicle 404 provides BSMs to MEC server 408. The BSM may include lane data. MEC server 408 may determine that vehicle 404 is approaching the traffic queue and is in the lane in which the traffic queue has formed. MEC server 408 may send an alert 414 to vehicle 404 indicating that there is an upcoming queue, zone-based speed limits, or other information that can be used by the vehicle to determine appropriate operating conditions. In various embodiments, vehicle 404 will receive alert 414. The alert may be used to surface information to a vehicle operator, for example, audio or visual indicators to a driver that there is an upcoming traffic queue, slowdown, or other relevant condition. In various embodiments, the traffic queue may be forming around a turn and may not be directly visible to the driver when the alert is received. In various embodiments, the alert 414 comprising a zone-based speed limit and the vehicle compares the vehicle's current speed to the zone-based speed limit. If the vehicle is traveling faster than the zone-based speed limit, a beep, visual indicator, caution message, or other information may be provided to the vehicle. In some embodiments, MEC server 408 uses BSMs to determine whether a vehicle is driving at a speed that exceeds the zone-based speed limit and transmits a caution message or alert to the vehicle, instructions to an autonomous or driver assistance system that can take an appropriate action.

In various embodiments, a vehicle operator (e.g., driver or autonomous driving system) may receive an alert to perform a mitigation. For example, the mitigation may be for the vehicle 404 to reduce its speed. In some embodiments, the mitigation may be for the driver to change lanes—for example, shifting into a diversion lane as depicted in FIG. 4. In some embodiments, vehicle 402 will receive an alert 412 that there is a fast approaching vehicle coming up behind it, which may allow vehicle 402 or its operators time to perform a mitigation, such as pulling over to a shoulder, activate blinkers or other visual indicators, or perform other mitigations to avoid or reduce a potential adverse situations by vehicle 404 in the event that the vehicle is not able to stop in time.

Figure 5:
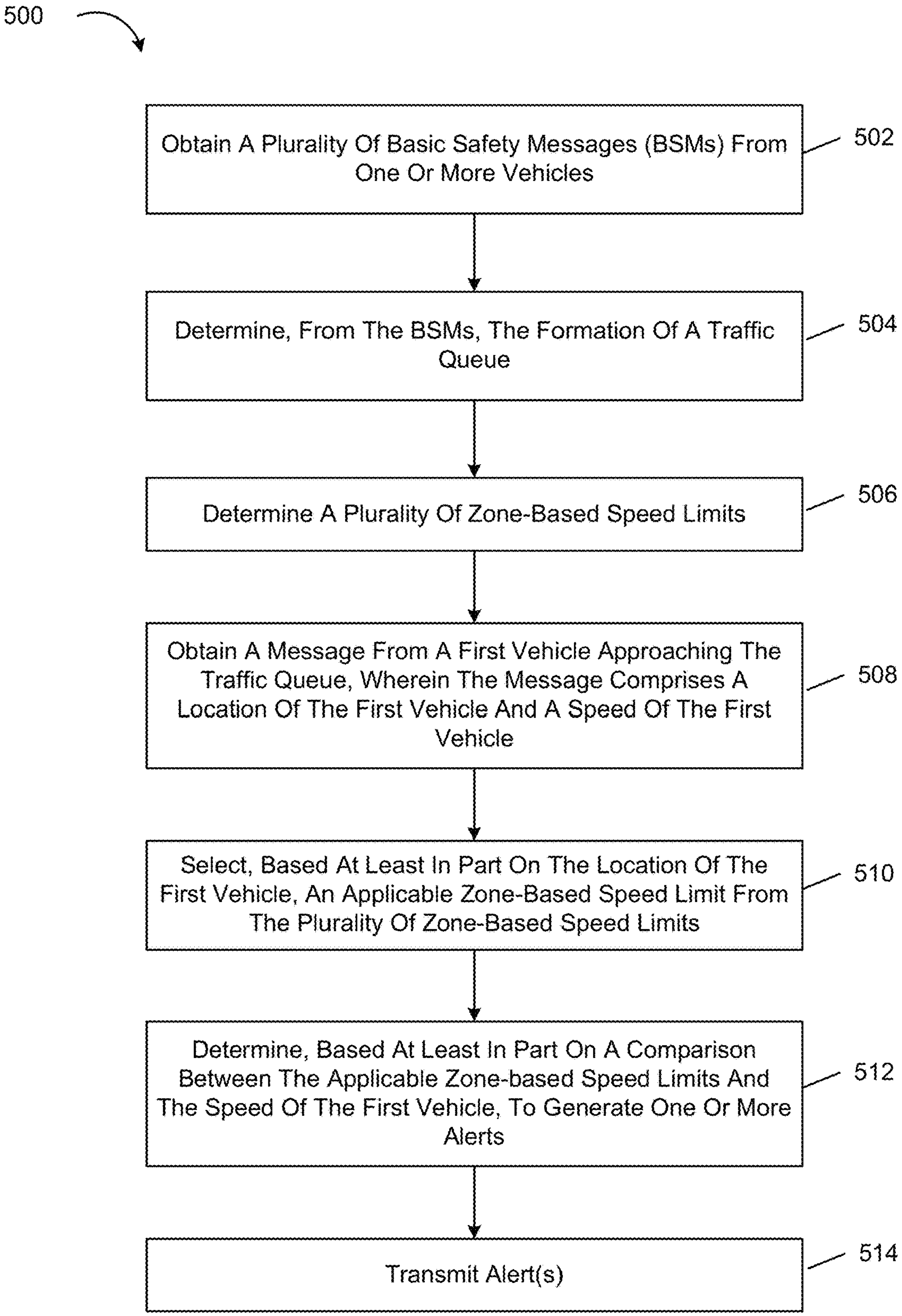
FIG. 5 shows an illustrative example of a process for edge computing assisted vehicle alerts, in accordance with one or more example embodiments of the present disclosure.

FIG. 5 shows an illustrative example of a process 500 for edge computing assisted vehicle alerts, in accordance with one or more example embodiments of the present disclosure. In at least one embodiment, some or all of the process 500 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program storing a plurality of computer-readable instructions executable by one or more processors. The computer-readable storage medium, in at least one embodiment, is a non-transitory computer-readable medium. In at least one embodiment, at least some of the computer-readable instructions usable to perform the process 500 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 500 may be implemented in the context of various systems and methods described elsewhere in this disclosure, such as those discussed in connection with FIGS. 1-4. In at least one embodiment, process 500 or a portion thereof is collectively implemented by a controller system of a vehicle. In various embodiments, steps of process 500 and/or other processes are performed by a multi-access edge computing (MEC) server.

In various embodiments, process 500 comprises a step 502 to obtain a plurality of basic safety messages (BSMs) from one or more vehicles. In various embodiments, vehicles emit data at regular intervals in the form of Basic Safety Messages (BSMs). The data may include information regarding the state of a vehicle. For example, a vehicle may emit a packet of data that includes its measured location (e.g., as GPS coordinates), the direction it is headed, its present velocity, and so on and so forth. In various embodiments, lane data is also collected by the vehicle. For example, vehicles may transmit a regular stream of BSMs to nearby network infrastructure that routes the BSMs to the system (e.g., a MEC server) performing process 500.

In various embodiments, process 500 comprises a step 504 to determine, from the BSMs, the formation of a traffic queue. The traffic queue may be determined based on the BSM data, including lane data, that vehicles are slowing down, in close proximity to each other, or other indications that there may be a queue, jam, or other traffic condition being experienced by the vehicles based on the BSMs.

In various embodiments, process 500 comprises a step 506 to determine a plurality of zone-based speed limits. The zone-based speed limits may be determined relative to the traffic queue. For example, a first zone-based speed limit may encompass the queue itself, and there may be additional zone-based speed limits that are progressively larger in value based on distance to the queue, for example, as discussed in connection with FIG. 3.

In various embodiments, process 500 comprises a step 508 to obtain a message from a first vehicle approaching the traffic queue, wherein the message comprises a location of the first vehicle and a speed of the first vehicle. The message may be a BSM with lane data that indicates the location (e.g., GPS coordinates), direction, and speed of the vehicle. The vehicle may use one or more sensors (e.g., cameras) to determine lane data that specifies a particular lane that the vehicle is in.

In various embodiments, process 500 comprises a step 510 to select, based at least in part on the location of the first vehicle, an applicable zone-based speed limit from the plurality of zone-based speed limits. The location of the vehicle may be mapped to one of zones and the zone may have a corresponding zone-based speed limit, for example, as described in connection with FIG. 3.

In various embodiments, process 500 comprises a step 512 to determine, based at least in part on a comparison between the applicable zone-based speed limit and the speed of the first vehicle, to generate one or more alerts. If the vehicle is traveling faster than the applicable zone-based speed limit, then the vehicle may be provided with a zone-based speed alert.

In various embodiments, process 500 comprises a step 514 to transmit alert(s). For example, a zone-based speed alert may be transmitted to the vehicle approaching the queue. The last vehicle in the queue may receive an approaching vehicle alert that that there is a fast approaching vehicle in the same lane, thereby providing the vehicle with an opportunity to shift lanes or pull over to a shoulder. In some cases, multiple vehicles at or near the end of a traffic queue receive alerts of a fast approaching vehicle. In some embodiments, an alert comprises instructions for an autonomous or semi-autonomous driving system to, for example, apply braking, shift the vehicle to a diversion lane, or take other precautionary measures.

Figure 6:
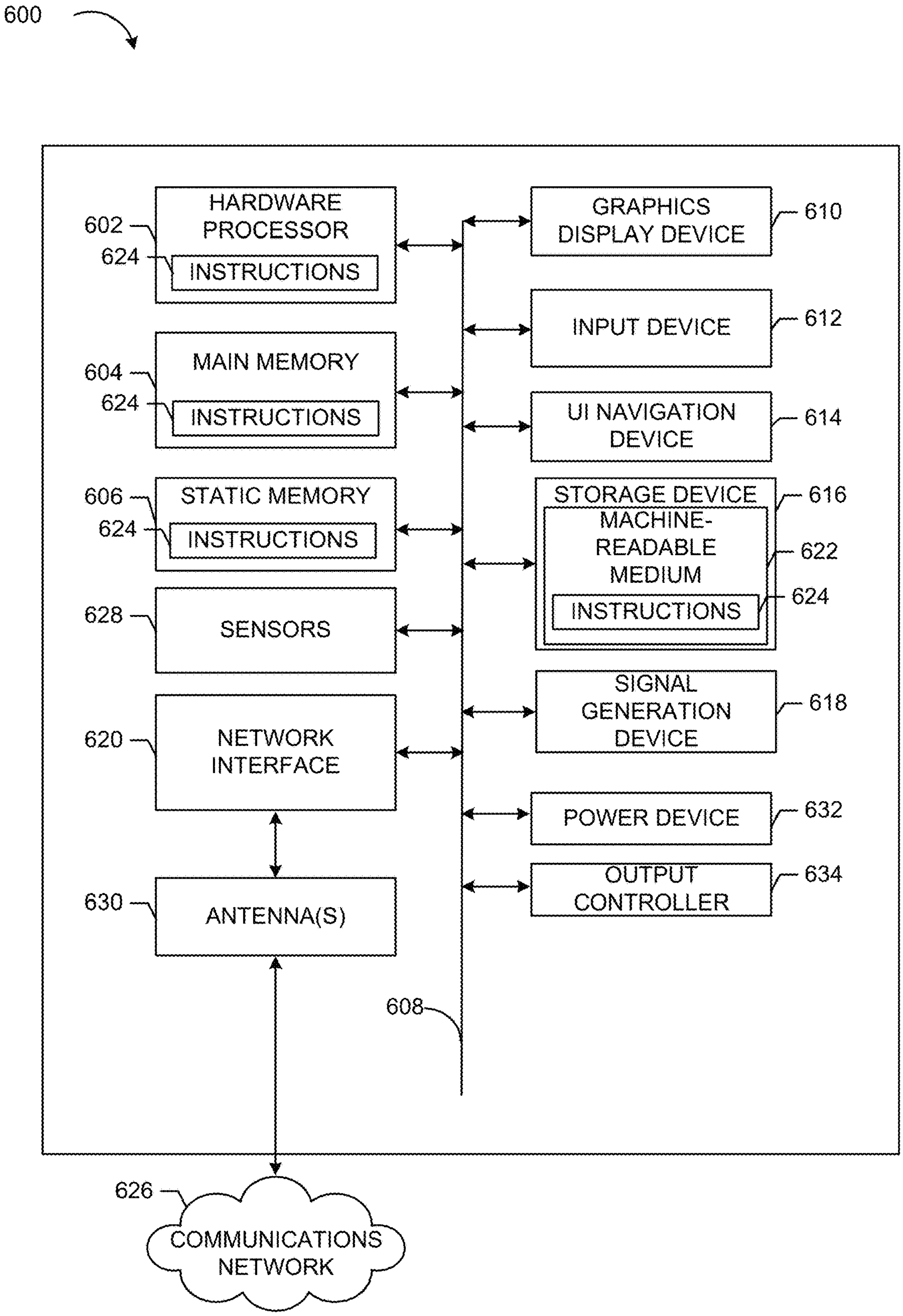
FIG. 6 illustrates a block diagram of an example of a machine or system upon which any one or more of the techniques (e.g., methodologies) discussed herein may be performed.

FIG. 6 illustrates a block diagram of an example of a machine 600 or system upon which any one or more of the techniques (e.g., methodologies) discussed herein may be performed. The machine (e.g., computer system) 600 may include any combination of the illustrated components. For example, the machine 600 may include a hardware processor 602 (e.g., a central processing unit (CPU), a graphics processing unit (GPU), a tensor processing unit (TPU) including an artificial intelligence application-specific integrated circuit (ASIC), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a data signal), a network interface device/transceiver 620 coupled to antenna(s) 630, and one or more sensors 628, such as a sound detecting sensor (e.g., a microphone), accelerometers, magnetometers, location sensors, and the like. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media. In various embodiments, a vehicle's controller system is implemented using one or more machines (e.g., machine 600).

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include DOCSIS, fiber optic, a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cable box, a wearable smart device, cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a wearable smart device, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, DOCSIS, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Implementations of the systems, apparatuses, devices, and methods disclosed herein may comprise or utilize a special purpose or general-purpose computer including computer hardware, such as, for example, one or more processors and system memory, as discussed herein. Computer-executable instructions comprise, for example, instructions and data which, when executed at a processor, cause a general-purpose computer, special purpose computer, or special purpose processing device to perform a certain function or group of functions. An implementation of the devices, systems and methods disclosed herein may communicate over a computer network. A "network" is defined as one or more data links that enable the transport of electronic data between computer systems and/or modules and/or other electronic devices.

Although the subject matter has been described in language specific to structural features and/or methodological acts, it is to be understood that the subject matter defined in the appended claims may not necessarily be limited to the described features or acts described above. Rather, the described features and acts are disclosed as example forms of implementing the claims.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Conditional language, such as, among others, “can,” “could,” “might,” or “may,” unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method, comprising:

obtaining, by one or more processors of a multi-access edge computing (MEC) server, a plurality of messages from a plurality of vehicles travelling on a road, each of the plurality of messages including, for a respective vehicle of the plurality of vehicles, a current location of the vehicle, a direction of heading of the vehicle, a speed of the vehicle, and lane information associated with the vehicle;

determining, by the one or more processors and based on the plurality of messages, formation of a traffic queue on the road;

determining, by the one or more processors based on the plurality of messages, a plurality of zone-based speed limits for the road;

obtaining, by the one or more processors, a first message from a first vehicle, from among the plurality of vehicles, approaching the traffic queue, wherein the first message comprises a first location of the first vehicle and a first speed of the first vehicle;

selecting, by the one or more processors and based at least in part on the location of the first vehicle, a first zone-based speed limit from the plurality of zone-based speed limits;

generating, by the one or more processors and based at least in part on a comparison between the applicable zone-based speed limits and the speed of the first vehicle, a second message, the second message including information about the first zone-based speed limit;

sending, by the one or more processors, the second message to the first vehicle; and automatically controlling, by an autonomous driving system of the first vehicle and based on the second message, a speed of the first vehicle.

2. The method of claim 1, wherein the the second message further comprises an indication that the first speed of the first vehicle exceeds the first zone-based speed limit.

3. The method of claim 1, further comprising:

determining, by the one or more processors, that a second vehicle and the first vehicle are both in a lane of the traffic queue and the second vehicle is in front of the first vehicle; and transmitting, by the one or more processors, a third message to the second vehicle, wherein the alert third message comprises an indication that the first vehicle is approaching the second vehicle.

4. The method of claim 3, further comprising transmitting, by the one or more processors, the third message to a third vehicle in the lane.

5. The method of claim 1, wherein the plurality of messages are a plurality of basic safety messages (BSMs).

6. The method of claim 1, wherein the plurality of zone-based speed limits are determined relative to the traffic queue.

7. A non-transitory computer-readable storage medium storing executable instructions that, as a result of being executed by one or more processors of a computer system of a vehicle, cause the computer system to at least:

obtain a plurality of messages from a plurality of vehicles travelling on a road, wherein each message of the plurality of message includes, for a respective vehicle of the plurality of vehicles, a current location of the vehicle, a direction of heading of the vehicle, a speed of the vehicle, and lane data associated with the vehicle;

determine, based at least in part on the plurality of messages, formation of a traffic queue on the road;

determine, based on the plurality of messages, a plurality of zone-based speed limits for the road;

obtain a first message from a first vehicle, from the plurality of vehicles, that is approaching the traffic queue, wherein the first message comprises a first location of the first vehicle and a first speed of the first vehicle;

select, based at least in part on the first location of the first vehicle, a first zone-based speed limit from the plurality of zone-based speed limits;

generate, based at least in part on a comparison between the first zone-based speed limits and the speed of the first vehicle, a second message, the second message including the first zone-based speed limit;

send the second message to the first vehicle; and automatically control, by an autonomous driving system of the first vehicle and based on the second message, a speed of the first vehicle.

8. The non-transitory computer-readable storage medium of claim 7, wherein second message further comprises an indication that the first speed of the first vehicle exceeds the first zone-based speed limit.

9. The non-transitory computer-readable storage medium of claim 7, wherein the executable instructions, as a result of execution by the one or more processors, further causes the computer system to:

determine that a second vehicle and the first vehicle are both in a first lane of the traffic queue and the second vehicle is in front of the first vehicle; and transmit a third message to the second vehicle, wherein the third message comprises an indication that the first vehicle is approaching the second vehicle.

10. The non-transitory computer-readable storage medium of claim 9, wherein the executable instructions, as a result of execution by the one or more processors, further causes the computer system to:

transmit the third message to a third vehicle in the first lane.

11. The non-transitory computer-readable storage medium of claim 7, wherein the plurality of messages are a plurality of basic safety messages (BSMs).

12. A multi-access edge computing (MEC) server, comprising:

one or more processors; and memory storing executable instructions that, as a result of being executed by the one or more processors, cause the one or more processors to:

obtain a plurality of messages from a plurality of vehicles travelling on a road, wherein each message of the plurality of messages includes, for a respective vehicle of the plurality of vehicles, a current location of the vehicle, a direction of heading of the vehicle, a speed of the vehicle, and lane data associated with the vehicle;

determine, based at least in part on the plurality of messages, formation of a traffic queue on the road;

determine a plurality of zone-based speed limits for the road;

obtain a first message from a first vehicle, from among the plurality of vehicles, that is approaching the traffic queue, wherein the first message comprises a location of the first vehicle and a speed of the first vehicle;

select, based at least in part on the location of the first vehicle, a first zone-based speed limit from the plurality of zone-based speed limits;

generate, based at least in part on a comparison between the first zone-based speed limit and the speed of the first vehicle, a second message that includes the first zone-based speed limit;

send the second message to the first vehicle; and automatically control, by an autonomous driving system of the first vehicle and based on the second message, a speed of the first vehicle.

13. The server of claim 12, wherein the second message further comprises an indication that the speed of the first vehicle exceeds the first zone-based speed limit.

14. The server of claim 12, wherein the plurality of vehicles includes a second vehicle and the executable instructions, as a result of execution by the one or more processors, further causes the one or more processors to:

determine, based on the lane data associated with each of the vehicles in the plurality of vehicles, that the second vehicle and the first vehicle are both in a lane of the traffic queue and that the second vehicle is in front of the first vehicle; and transmit a third message to the second vehicle, wherein the the third message comprises an indication that the first vehicle is approaching the second vehicle.

15. The server of claim 14, wherein the executable instructions, as a result of execution by the one or more processors, further causes the one or more processors to:

transmit the the third message to a third vehicle that is in the lane.

16. The server of claim 12, wherein the plurality of messages are a plurality of basic safety messages (BSMs).

17. The server of claim 12, wherein the plurality of zone-based speed limits are determined relative to the traffic queue.

18. The method of claim 3, wherein the third message causes the second vehicle to perform one or more actions.

19. The method of claim 18, wherein the one more actions include:

taking a diversion lane to avoid the first vehicle;

operating blinkers to warn the first vehicle; or pulling over a shoulder of the road.

* * * * *